United States Patent [19]

Balogh et al.

[11] Patent Number: 4,681,405

[45] Date of Patent: Jul. 21, 1987

[54] METHOD AND LENS FOR PRODUCING A WIDE ANGLE IMAGE

[76] Inventors: Thomas K. Balogh, 1940 Golfview, Apt. 202, Troy, Mich. 48084; John M. Balogh, 5129 Kolmar, Chicago, Ill. 60648

[21] Appl. No.: 656,588

[22] Filed: Oct. 1, 1984

[51] Int. Cl.[4] .................. G02B 13/08; G02B 3/08; G03B 21/60
[52] U.S. Cl. ........................... 350/420; 350/128; 350/452
[58] Field of Search ............. 350/420, 421, 125, 452, 350/117, 127, 128

[56] References Cited

U.S. PATENT DOCUMENTS

| | | | |
|---|---|---|---|
| 2,824,396 | 2/1958 | Thomas | 350/420 X |
| 3,644,037 | 2/1972 | Larraburu | 350/420 X |
| 3,761,162 | 9/1973 | Hall | 350/420 X |
| 3,820,873 | 6/1974 | Radington et al. | 350/125 |

Primary Examiner—John K. Corbin
Assistant Examiner—Scott J. Sugarman
Attorney, Agent, or Firm—John R. Benefiel

[57] ABSTRACT

A method and anamorphic viewing lens is disclosed for producing a wide angle television or other CRT screen display, which display is expanded along the horizontal axis to allow increased visual information content or to change the aspect ratio for television viewing of wide screen motion pictures. The method includes the step of producing a width-compressed record of a field of visual features, displaying the width-compressed video record on a television or other CRT screen, which display is viewed through a single axis anamorphic viewing lens according to the invention to produce a width-expanded image of the television screen displayed record. The width-compressed video record is produced in several ways including filming a scene through an anamorphic lens system; recording the scene through a second reverse geometric version of the anamorphic lens according to the present invention; or by electronic processing of the video signal data. Alternatively, the anamorphic record may be projected through a single axis anamorphic lens for direct viewing of a width-expanded image. The single axis anamorphic lens comprises an eschelon lens formed by a sheet of optically transparent material having a series of parallel, vertical sawtooth grooves formed into one face, which increase nonlinearly in angularity from the center of the lens to the outer lateral edges.

10 Claims, 11 Drawing Figures

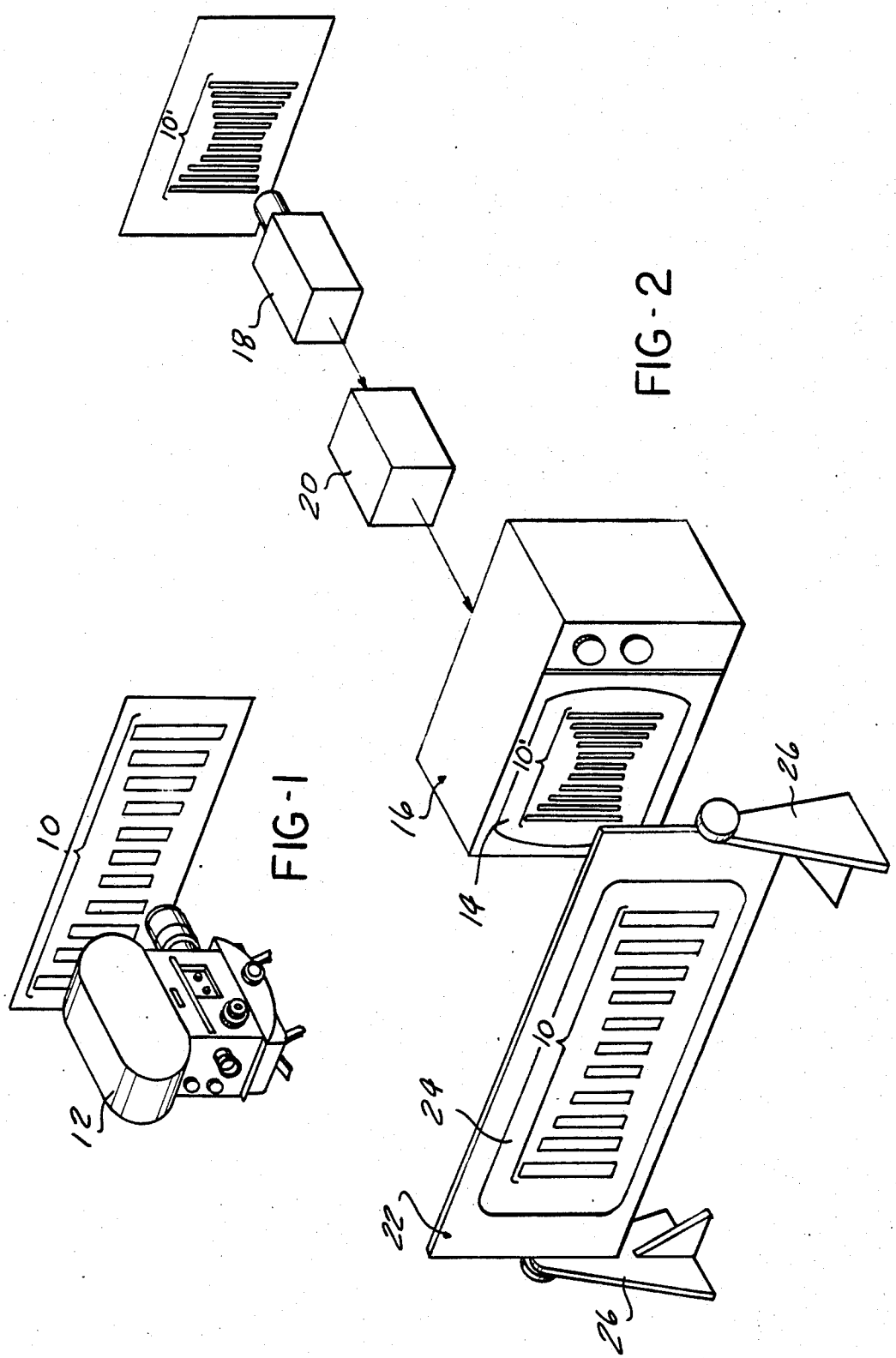

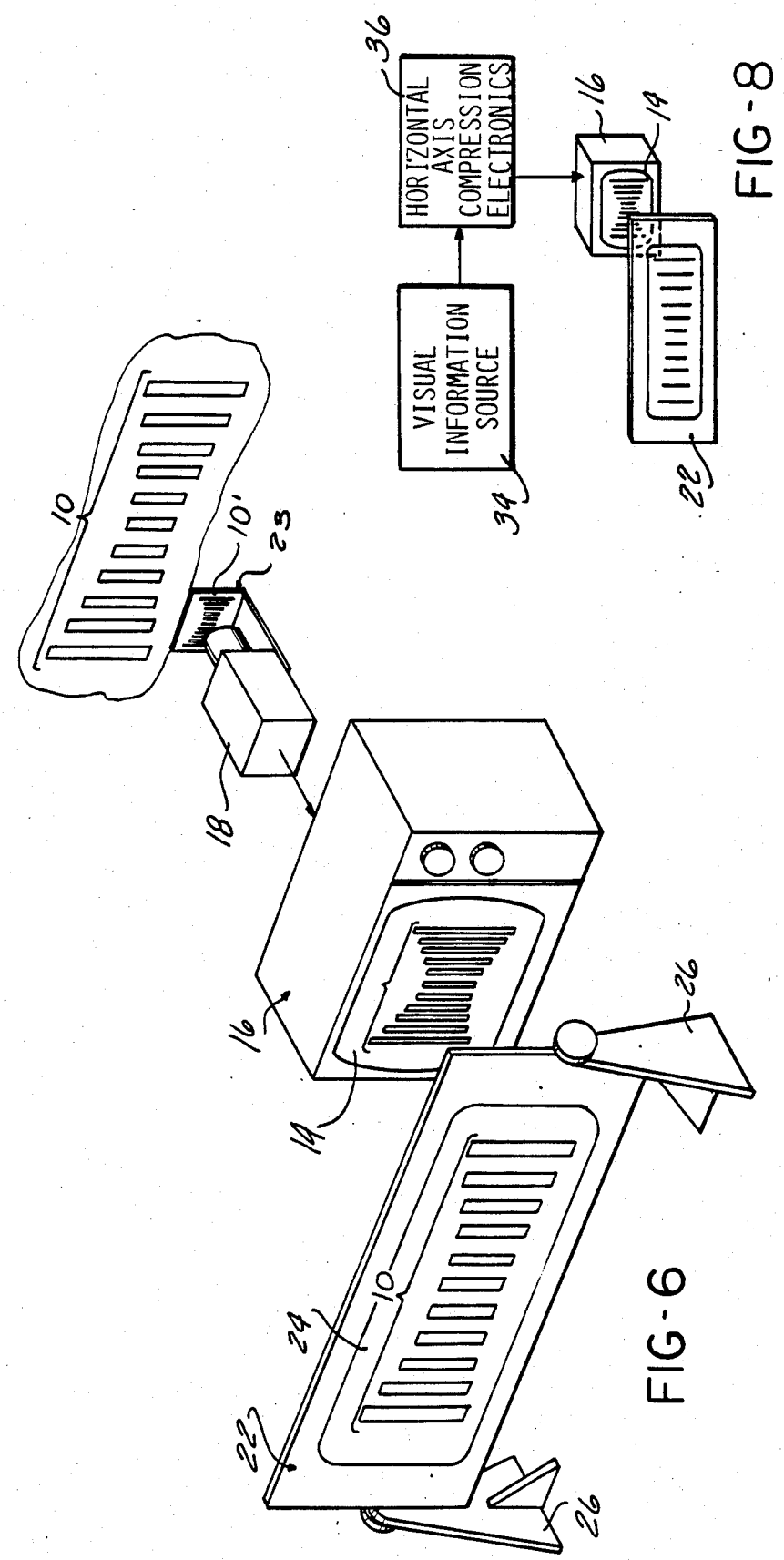

METHOD AND LENS FOR PRODUCING A WIDE ANGLE IMAGE

BACKGROUND DISCUSSION

The present invention concerns display systems and more particularly display systems involving the use of a TV or other CRT screen display of visual information such as a televised scene or a display of graphical or alphanumeric information.

DESCRIPTION OF THE PRIOR ART

Television screen displays have been recognized as involving inherent limitations due to the standard 3×4 format. There are a number of situations where an expanded horizontal axis aspect ratio would provide a superior display, or where an increased field of view is desirable for a televised scene. Additionally, in displaying certain technical information such as in the CAD-CAM display of mechanical drawings and the like, an increased informational content of the television image would be possible with an aspect ratio expanded along the horizontal axis.

In the field of motion pictures, the superiority of a wide angle over a 3×4 format has long been recognized for many scenes.

One system for producing wide angle format involves the use of the so-called anamorphic lens system. Such systems have a width-compressed image produced on a standard 35mm motion picture film with the 3×4 format of a standard 35mm frame. The film is then projected in the motion picture theater by means of a corresponding anamorphic lens system, which width expands the image to produce a wide angle scene on a theater screen. Such systems are known under the trademarks "Cinemascope" and "Panavision".

No similar system for accommodating a wide angle format to a television display has heretofore been provided.

Also, the televising of such wide angle films produces difficulties due to the mismatch of the aspect ratio of the wide angle films and the television receiver screen. The televising of the width-expanded image results in the need to crop the sides of the scenes. If such scenes were filmed without anticipating the need for televising the film in the 3×4 format, a significant loss in the visual information could result.

There has also long been a demand for increased size of the television display. The television screen itself is difficult to enlarge beyond the 25-inch screen sizes currently available. In order to increase the size of a television image, projection systems have been devised and commercialized, but these systems are relatively complex and costly. These systems also do not accommodate the need for a wide angle format of televised visual information.

One approach to increase the television screen image has been the use of a Fresnel viewing lens positioned in front of the television screen and a viewing of the television image through the lens. Use of the Fresnel lens is limited to a relatively narrow viewing angle, within which the viewer must be positioned relatively closely aligned with the lens center to avoid distortion and loss in brightness of the image.

Pay television broadcasters have also long sought a means for controlling the viewing of a televised program without license from the broadcaster. The usual approach for satellite television and the like has been to provide a scrambled signal transmission which is then decoded or unscrambled by equipment rented from the broadcaster.

Accordingly, it is an object of the present invention to provide a lens and method of producing a wide angle image of televised field of visual features.

It is a further object of the present invention to provide such system which allows conversion of a standard television screen format to be converted to a wide angle viewed image.

It is a further object of the present invention to provide such system which allows conversion of a standard television screen format to be converted to a wide angle viewed image.

It is still another object of the present invention to provide a primarily horizontal magnification of a television image by a simple anamorphic viewing lens which allows relatively great angles of viewing without distortion and deterioration of the image brightness.

It is yet another object of the present invention to provide a means for televising wide screen motion picture films in the original wide angle format.

It is still another object of the present invention to provide a method of producing a television image which is directly viewable without the use of additional equipment other than a special anamorphic viewing lens.

SUMMARY OF THE INVENTION

These and other objects of the present invention, which will become apparent upon a reading of the following specification and claims, are achieved by the use of a special single axis anamorphic lens which enables an image to be generated which is expanded or magnified along a single horizontal axis. This lens is positioned before a television screen to allow understored viewing of a width-compressed viewable, but width distorted image on the television screen to produce a wide angle viewing of televised visual information. A variation of the lens produces a width-expanded image for use with a projection TV when the image is projected through the lens onto a viewing screen.

The width-compressed television screen image may be produced in several ways:

Anamorphically filmed wide screen movies may be directly televised in the compressed state such that viewing of the screen with the single axis anamorphic lens restores the wide angle or normal image. This approach also adapts the 3x4 television format to the wide angle, wide screen motion picture aspect ratio to enable a television image in the same wide screen proportion.

A width-compressed record of a scene or other field of visual information may also be produced by using a second version of the single axis anamorphic lens and positioning the lens and a television camera before a scene to produce the compressed TV record of the scene.

The width-compressed record may also be achieved by electronic processing of electrical signals or data corresponding to a viewed image.

The method may be utilized for televising scenes or also for display of other visual information such as graphics or an alphanumeric field.

The lens is an eschelon lens formed of a sheet of optically transparent material having a vertical series of parallel grooves or recesses shaped into one face of the sheet. The grooves are sawtooth in shape having angled surfaces connected by perpendicular connecting side surfaces and beginning from a central location the height and angle change progressively but nonlinearly. This increase in angularity achieves a light refraction therethrough which causes a magnification along the horizontal axis only. This allows a relatively wide angle of viewing without significant image distortion or reduction in image intensity for brightness, to be well suited for home television viewing.

The lens angled surfaces are tilted away from the lens center for direct viewing or image expanding use, but are tilted towards the center for projection viewing or image compressing use.

This also allows a considerable margin of error in the positioning of the television screen with respect to the anamorphic viewing lens.

The televising of a width-compressed image also in effect results in a scrambling of the television picture and the necessity for the use of the width-expanding viewing lens which thereby may be leased to television viewers to control access for pay television operators.

DESCRIPTION OF THE DRAWINGS

FIG. 1 is a perspective view of the anamorphic filming of a scene.

FIG. 2 is a perspective view of the major components in a television broadcast system and the anamorphic lens according to the present invention, illustrating the method of generating a width-expanded television image for direct viewing of the scene shown being filmed in FIG. 1.

FIG. 6 is a perspective diagrammatic view of the major components in a television televising system, together with the alternate forms of the anamorphic viewing lenses utilized with such system to produce the width-expanded television image, in which an alternate method is utilized to produce a width-compressed record of the viewed field of visual information.

FIG. 8 is a diagrammatic representation of a television system utilizing an alternate method of generating a width-compressed record.

DETAILED DESCRIPTION

Figure 3:
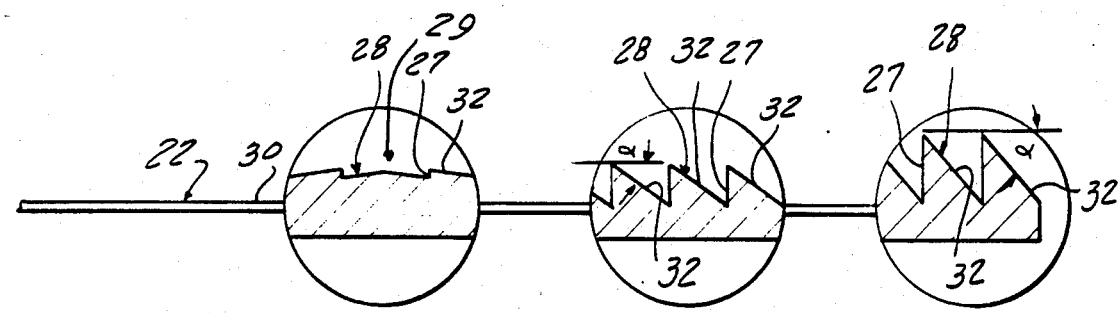
FIG. 3 is a transverse sectional view through the anamorphic eschelon lens according to the present invention shown in FIG. 1 with enlarged detailed regions thereof.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

According to the concept of the present invention, a record is generated of a field of visual features as indicated by the numeral 10 as shown in FIG. 1, as by making a film by means of a motion picture camera 12. The record generated is width-compressed as by the use of an anamorphic lens system used currently in the motion picture industry.

As represented in FIG. 2, the width-compressed record is then displayed on a television receiver screen 14 of a television receiver 16. This may be done by a studio projection of the film scene which is then televised with a vidicon television camera 18 which may be broadcast or otherwise transmitted by apparatus 20 to the television receiver 16.

The video signal, of course, may be transmitted to the television receiver 16 by a number of methods including closed circuit TV, cable TV, conventional broadcast, etc.

The width-compressed image displayed on the television screen 14, is viewable but distorted by the width compression, and according to the concept of the present invention, this distorted, viewable image is viewed through a single axis anamorphic lens 22 positioned in front of the television screen 14 such as to generate an image 24 of the original field of visual characters which is restored to the normal proportions by the action of the single axis anamorphic lens 22.

For this use, the lens 22 as shown in FIG. 3 consists of a rectangular sheet of transparent material, such as an optically true plastic, such as a clear acrylic, and which may be supported by suitable brackets 26. The long dimension of the rectangle is arranged horizontally and substantially in alignment with the television screen 14.

The single axis anamorphic effect is produced by an eschelon lens formed with a series of parallel sawtooth recesses or grooves 28 extending vertically into the forward face 30 of the anamorphic lens 22, i.e., the face positioned adjacent to the screen 14 of the television receiver 16.

Two versions of the lens are disclosed herein, a first version viewing a width-compressed scene shown in FIG. 3, and a second version for width-compressing a scene for subsequent viewing by the first version or for projection viewing a width-compressed record of a scene, as will be described hereinafter.

In the first version, each sawtooth includes an angled surface 32 tilted away from the center of the lenses 22 and 23 and a surface 27 perpendicular to the lens thickness and extending to the next angled surface 32.

The sawtooth grooves 28 are of progressively but nonlinearly varying geometry from the center of the lenses 22 and 23 to the side edges. That is, the grooves vary from a given angle $\alpha$ from the plane of the lens at the center and become progressively of sharper angle from the center to the side edges thereof.

The pitch or width of the grooves 28 is selected to be constant and relatively fine, i.e., 50–100 grooves per inch to minimize distortion.

It has been empirically determined by the present inventors that maximum angle equal to approximately 52° is possible before a "roll-off" distortion of the width-expanded image occurs.

For viewing wide angle motion pictures, the length L of the lens 22 equals 2.75 times the height W, which in turn should be related to the size of a standard format TV screen, i.e., the diagonal dimension d as follows:

$$W = \tfrac{8}{9} d$$

For example, assume the TV screen has a 12" diagonal dimension, the lens 22 will have a height of 8" and a length of 22".

Figure 10:
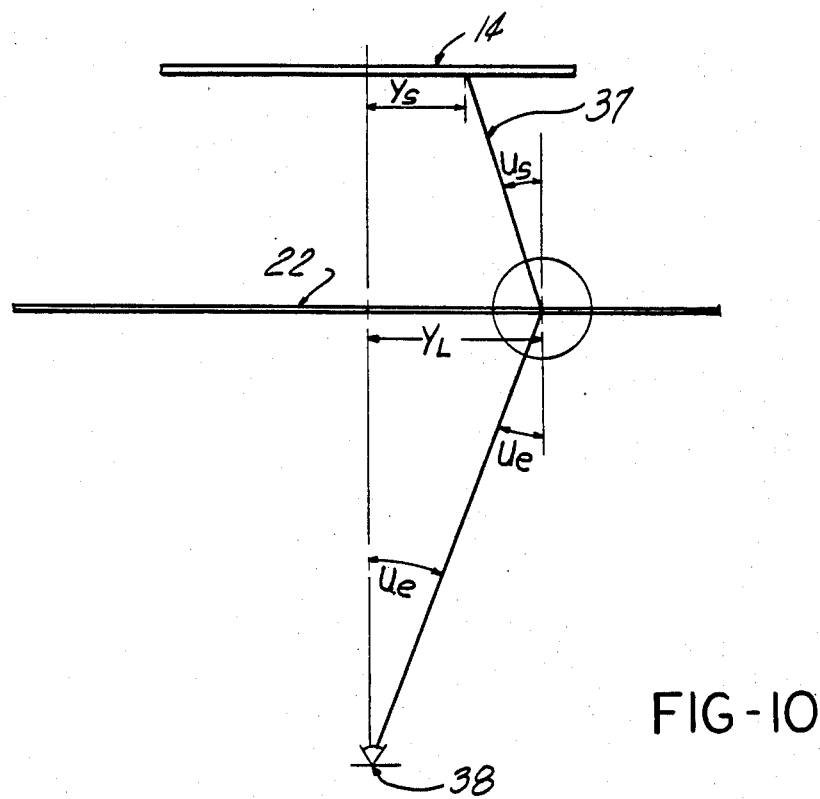
FIG. 10 is a diagrammatic view of the lens according to the present invention and a viewed scene depicting the path of a light ray.
Figure 10A:
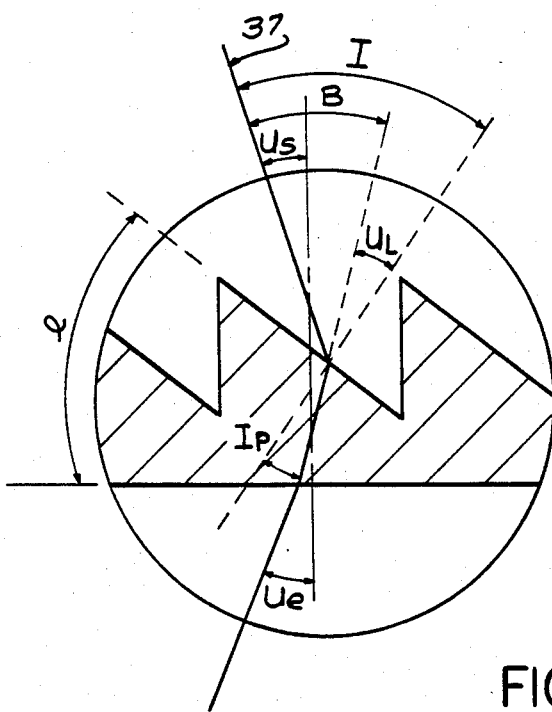
FIG. 10A is an enlarged view of the lens shown in FIG. 10 showing the path of a light ray therethrough.

The present inventors have determined that the centerpoint 29 of centermost groove 28 should be at approximately 0° and the angle at the outermost groove 28 (typical) increases to 52°. However, in order to match the anamorphically filmed wide angle motion pictures, this increase is nonlinear. The formula for the relationship between $Y_L$, any point along the horizontal axis, and the angle $\alpha$ of surface 28 at that point, is generated by the following process:

Given Snell's Law: $n \sin I = n^1 \sin I = n^1 \sin I^1$. Referring to FIG. 10, $U_e$ and $U_s$ are derived from the magnification requirements at the given distances.

$U_L$ (from Snell's Law and $U_e$) = $\sin^{-1}$ (sin ($U_e$) X index) (index refers to index of lens material).

$\beta$ = the "bend" required to redirect the ray 37 from the appropriate part of the screen 14 to that part of the lens 22 so the eye 38 perceives the expanded image.

$I_p$ (the angle from the ray 37 to the surface – normal inside the plastic) = $\tan^{-1} \dfrac{\sin \beta}{\text{index} - \cos \beta}$ I (the angle in air of surface – normal) = $I_p + \beta$.
Therefore: $\alpha = I + U_s$.

The lens 22 according to this geometry produces a magnification of the image shown on the television screen 14 when viewed through the lens 22, along only a single axis, in this case, the horizontal axis, to yield the width-expanded image of the width-compressed display.

The degree of magnification across the image width achieved by the nonlinearly varying angularity of surfaces 28 corresponds to the degree of compression of the originally proportioned field of visual features 10 created by an anamorphic film lens, such that the original horizontal proportions are restored. This in effect produces a wide angle aspect ratio image in contrast to the aspect ratio of conventional television receiver screens. That is, a view which is wider in proportion to the height of the television screen inasmuch as the anamorphic lens 22 does not result in any substantial magnification along the vertical axis.

Accordingly, it can be seen that this method yields a means for matching the aspect ratio of wide screen motion picture films for television home viewing to enable a wide angle format for television viewing.

Figure 4:
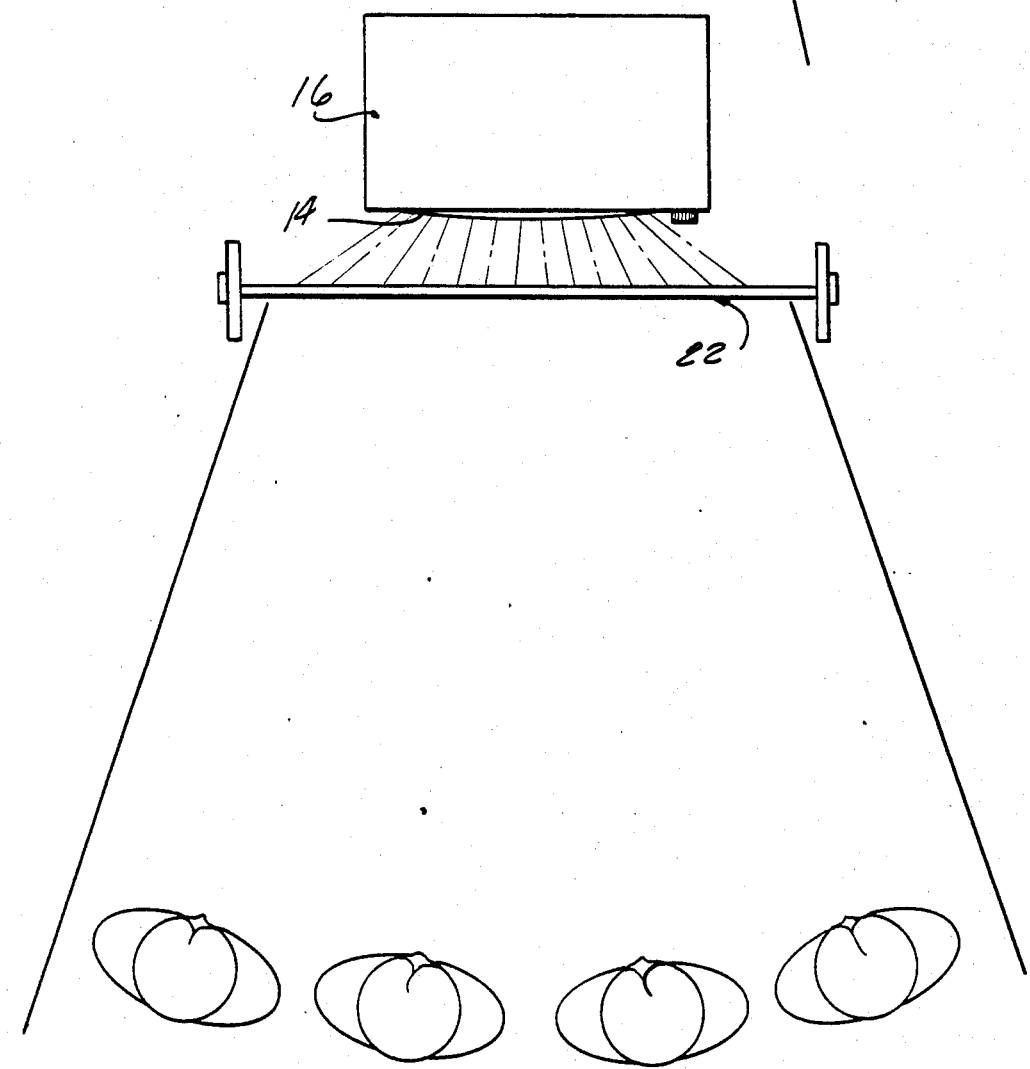
FIG. 4 is a plan view depicting the television receiver and anamorphic lens positioning with respect to a group of viewers.

It has also been determined by the present inventors that the single axis anamorphic lens may be viewed from considerable angles, as shown in FIG. 4, without significant distortion and loss of image intensity such that a large viewing group may view through the anamorphic lens 22.

Figure 5:
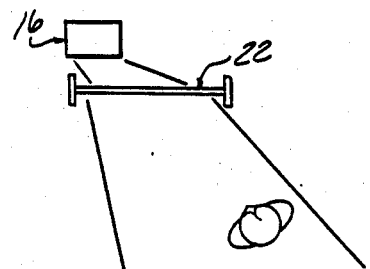
FIG. 5 is a plan diagrammatic view of a television screen receiver and anamorphic viewing lens depicting a mispositioning of the television screen.

It has been further determined that a laterally offset positioning of the television receiver 16 and the lens 22 is not critical to allow for considerable mispositioning as indicated diagrammatically in FIG. 5 without a substantial distortion of the expanded width image.

The concept is not limited to the viewing of anamorphically filmed scenes, but may also be employed to generally adapt standard television video cameras to the wide angle aspect ratio. This may be achieved by positioning the television camera 18 with a second version of the anamorphic lens 23 intermediate to the field of visual features 10. The lens 23 has a geometry described hereinafter such that a squeezed image 10' is produced and then transmitted to the television receiver 16 and displayed at 14, as before, and viewed through an anamorphic lens 22 according to the first version to create a normally proportioned image of the field of visual features 10, as in the abovedescribed embodiment.

Figure 7:
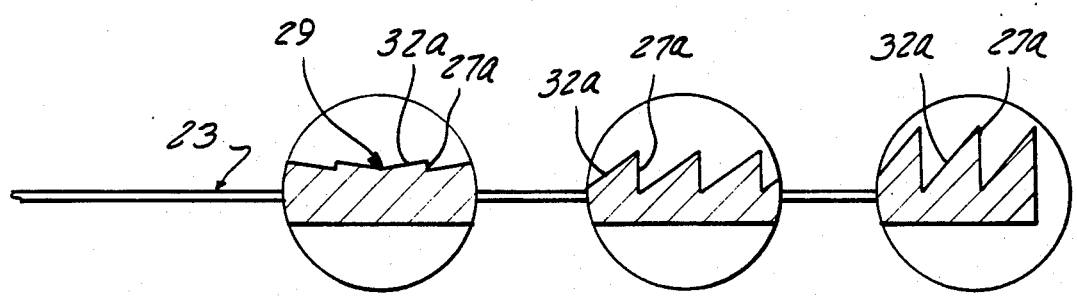
FIG. 7 is a transverse sectional view of an alternate form of the anamorphic eschelon lens according to the present invention used in the system of FIG. 6.

As shown in FIG. 7, the second version of the lens 23 has oppositely oriented angled surfaces 32a which are tilted towards the center of the lens 23, rather than away as in the first version described above. This produces width compression of an image transmitted therethrough.

The concept as mentioned above may also be applied to viewing of visual features other than a scene, i.e., graphical data, technical information, drawing views and the like. In such cases, the record of field of visual features may be recorded to provide a source 34 (FIG. 8) of visual information. An electronic processing of the data may be carried out by suitable processing electronics 36 which is then displayed on a television receiver screen 14 in a compressed state and thence viewed through an anamorphic lens 22, as in the abovedescribed embodiments.

Figure 9:
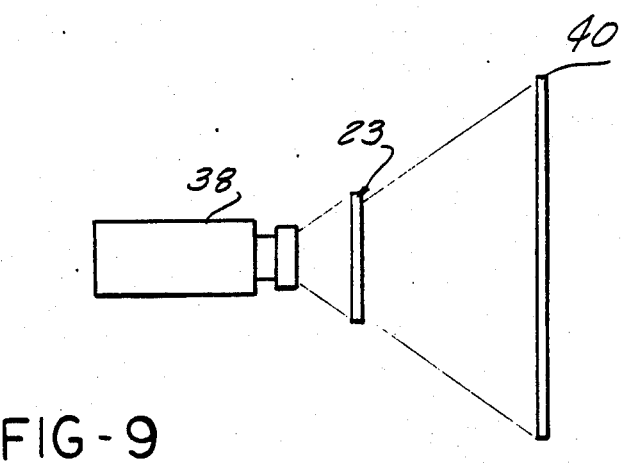
FIG. 9 is a diagrammatic view of a projection system for viewing a width-expanded image using the alternate form of anamorphic eschelon lens of FIG. 7.

For projection TV, the lens 23 may allow projection of a width-expanded image for direct viewing as shown in FIG. 9. This may be applied to each of the usual color "gun" three projection lens assembly, which has a lens 23 according to the present invention placed between it and a screen 40. This produces the wide angle format image and the screen 40 of course must be configured to accommodate this reformatted image.

In this application, the lens may be of round shape and the relationship between the outside diameter of the projector lens and lens 23 is suitable to accommodate the projected image.

It can be appreciated that the width-expanded or wide angle viewing format can greatly enhance the use of a television display for such applications as CAD-CAM systems dealing with technical drawing and similar graphical data.

It can also be appreciated that the wide angle format for such applications increases considerably the quantity of visual information which can be covered by a television screen display by the single axis magnification afforded by the anamorphic lens 22 according to the concept of the present invention.

It can be further appreciated that the transmission of a width-compressed image or display on a television receiver screen 14 in effect provides a means for generating a scrambled image which allows some degree of control by pay television operators over access to the television video programming.

It will be understood that a great many variations in the specific implementation of this method and the anamorphic lens according to the present invention are possible within the scope of the concept of the present invention. It will also be understood by those silled in the art that lens refinements would be applicable to reduce distortion and improve lens efficiency such as coating techniques for color correction.

The thickness of the lenses 22 and 23 should be sufficient to insure proper stiffness for structural integrity and that the thickness may vary from the center to compensate for the deeper groove depths.

We claim:

1. A method of creating an image of a horizontally disposed field of visual features including the steps of:
    forming a record of said field which record comprises a representation of said features compressed along the horizontal axis of said field;
    forming a viewable but width distorted image of said horizontal axis compressed record by displaying said record on a television screen;
    viewing the width distorted image through a lens positioned before said television screen displaying said viewable but distorted image, which lens is cofigured to create an expanded width corrected viewable image of said television screen display, which expansion is only along the horizontal axis and which expansion corresponds to the degree of compression carried out in said step of forming said record, whereby said expanded image corresponds substantially exactly to said field of visual features.

2. The method according to claim 1 wherein said step of forming said compressed record includes the steps of filming said field of visual features with an anamorphic lens, and wherein said step of forming an image of said horizontal axis compressed record includes the steps of projecting said film to form a compressed image, recording said image with a television camera, and displaying said televised compressed image on a television receiver screen.

3. The method according to claim 1 wherein said step of forming said compressed record includes the step of generating a video data record and electronically processing said data to produce said width-compressed record of said field.

4. The method according to claim 1 wherein said step of forming a horizontal axis compressed record includes the step of positioning a lens before said field of visual features which forms an image of said field of visual features compressed along the horizontal axis.

5. The method according to claim 2 wherein said step of displaying said televised compressed image includes the step of broadcasting a television signal to said television receiver.

6. An anamorphic image expanding/compressing lens comprising:
    a planar sheet of transparent material having a series of sawtooth parallel recesses formed on a face of said planar sheet extending thereacross, each of said sawtooth recesses comprised of a first surface disposed normally to the plane of said lens and a second surface extending at an angle from one side of said first surface to the other side of the first surface of the next adjacent recess, and wherein the angle of said first surface varies progressively to become greater for said recesses located more remotely from a central position extending across said lens face, said variation being a nonlinear function, according to the equation:

$$\alpha = I + U$$

wherein:
$\alpha$ is the angle
$I = I_p + \beta$ $$I_p = \tan^{-1} \frac{\sin\beta}{\text{index} - \cos\beta}$$

$\beta$ = the bend of the ray that reaches the eye
$\beta U_s$ = the varying angle of the ray between scree and lens.

7. The lens according to claim 6 wherein said angle of said surfaces from the plane of said lens varies nonlinearly from substantially 0° at the center of said lens to approximately 52° at either edge thereof.

8. The lens according to claim 7 wherein said grooves are approximately 0.010 to 0.030 inch in width.

9. The lens according to claim 6 wherein said angled surfaces are each tilted to face away from the center of said lens.

10. The lens according to claim 6 wherein said angled surfaces are each tilted to face towards the center of said lens.

* * * * *